Oct. 18, 1932.　　F. N. BARD　　1,883,469
STEAM PIPE COUPLING
Filed Nov. 21, 1924　　2 Sheets-Sheet 2
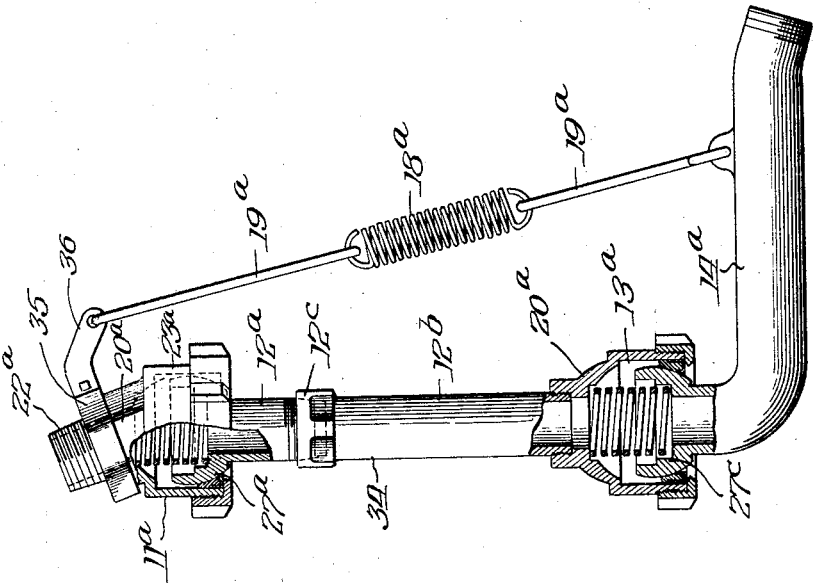
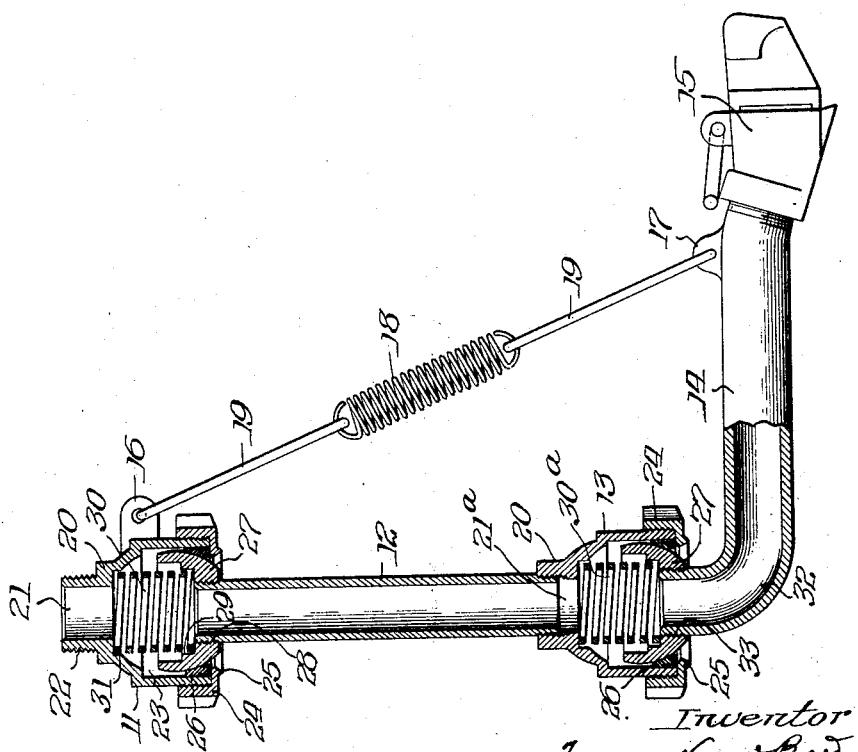

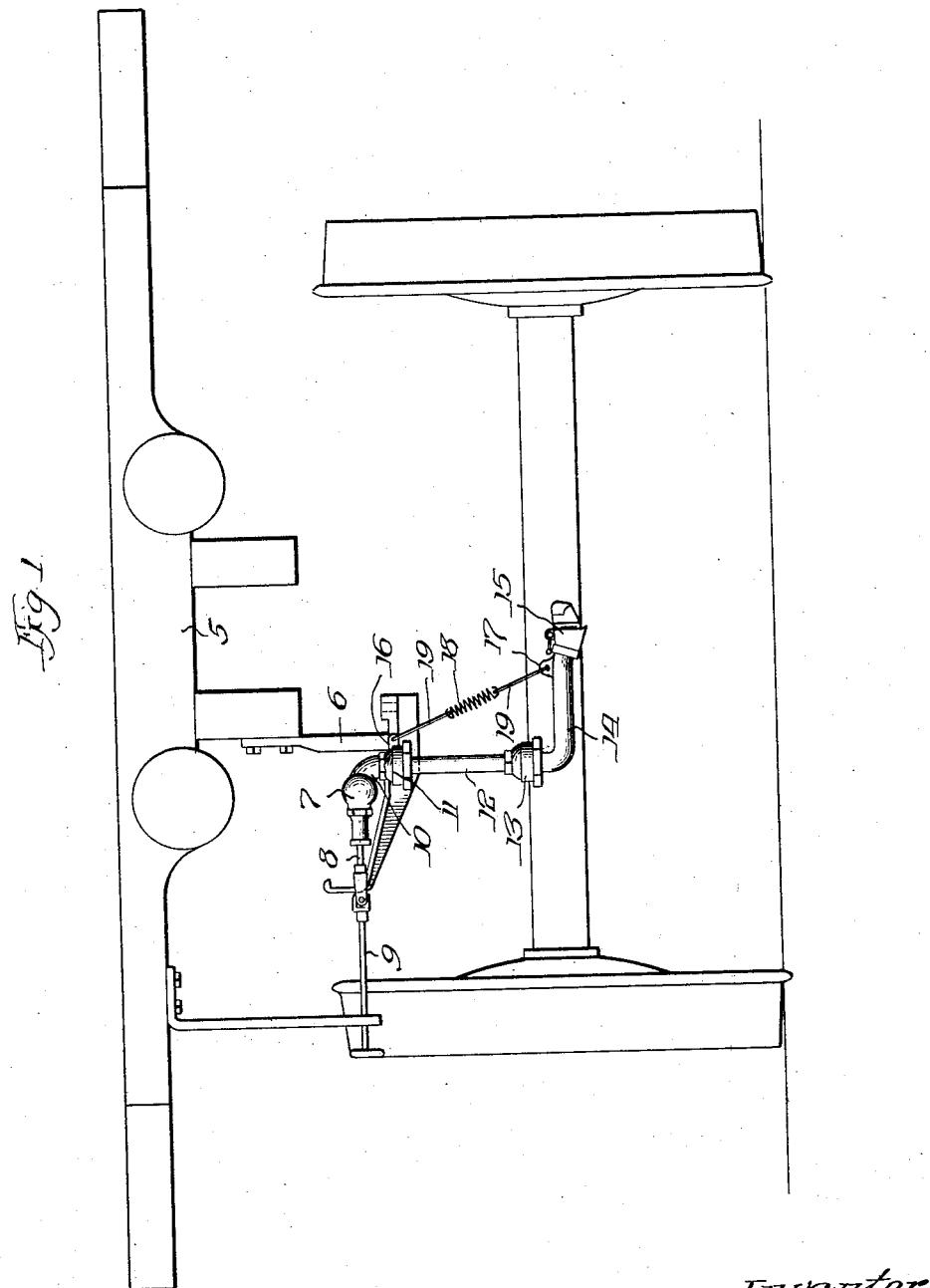

Patented Oct. 18, 1932

1,883,469

UNITED STATES PATENT OFFICE

FRANCIS N. BARD, OF HIGHLAND PARK, ILLINOIS

STEAM PIPE COUPLING

Application filed November 21, 1924. Serial No. 751,390.

My present invention relates in general to couplings between relatively movable fluid conveying elements, more particularly those wherein the factors of pressure or vibration (or both) enter, and has special reference to the provision of an improved form of connection between the engine and tender, or between several cars of a train.

The principal objects of my present invention are to improve, simplify, and cheapen the cost of production of such coupling devices; to render such devices less expensive in maintenance and less complicated in structure and operation; to minimize vibration; to compensate for inherent strains; and to lessen heat dissipation, together with such further objects as may hereinafter appear.

This invention is further characterized by the provision of an improved flexible pipe coupling including a minimum number of sections commensurate with efficient operation; the provision of an improved wear compensating joint between the sections; the provision of an improved wear compensating joint which tends to support the sections in predetermined angular relationship; the provision of an improved coupling including jointed pipe sections in which the joints include wear compensating and section supporting means; and the provision, in combination with jointed pipe sections, of auxiliary means for tending to maintain the sections in predetermined position to prevent the coupling, when employed on a railway car, from coming into violent contact with any point of the roadbed or track.

The foregoing and such other objects and advantages as may appear or be pointed out as this description proceeds are attained in the structural embodiment of this invention illustrated in the accompanying drawings, in which:

Figure 1 is an elevational view of part of a railway car showing the present invention applied in operative position;

Figure 2 is an enlarged elevational view, partly in section, of one form of the device; and Figure 3 is an alternative form of the invention.

Fluid connections of the present category must be substantially universally flexible in order to compensate for vertical, lateral and longitudinal relative movement between the two train elements the piping of which it connects, and must further make provision for the extension and contraction in the length of the pipe line, which are ensuant upon the compression of the springs in the draft gear mechanism.

In preferred practice, there must be a minimum of at least three flexible, preferably universal, joints used in the complete coupling.

On inspection of Figure 1, which shows the connector elements as they are carried at one end of a locomotive, tender or car, it will be understood that the opposite end of the adjacent train element carries a complementary connection, not shown, which connection is preferably a duplicate of the connector structure illustrated but may be a rubber hose connection.

Referring now more particularly to the drawings, and first to Figure 1, the end buffer of a railway car as shown, from which a bracket 6 is supported, said bracket serving to support the end angle-cock 7 which is attached to the end of the steam or air line (not shown) said angle-cock being provided with a valve stem 8, and a handle 9 for operating said valve stem.

The angle-cock is provided with an outlet nipple 10, which is attached to the upper part of a universal joint 11, said joint being connected with a depending conduit including the substantially vertical pipe section 12, universal joint 13, and substantially horizontal pipe section 14, which latter, at its outer end, carries a conventional form of coupler head 15.

I provide means in both of the universal joints 11 and 13 for the dual purpose of compensating for wear in these joints, and for tending to maintain the pipe sections in their normal positions as shown.

I also provide auxiliary means for yieldingly supporting the pipe sections in the position shown, which includes the lug 16 conveniently placed on the joint 11, the lug 17 conveniently placed on the pipe section 14, and a helical spring 18 having its opposite ends connected to said lugs by the provision of the links 19—19.

The depending pipe or conduit may take two general forms as shown in Figures 2 and 3, the form shown in Figure 2 being employed when the outlet nipple 10 of the angle cock 7 is presented substantially straight down and the other form of the invention being employed where the outlet nipple 10 extends at an angle other than substantially vertical.

Referring to the form of the device shown in Figure 2, the two universal joints 11 and 13 will be seen to be substantially identical in construction, and for this reason I will describe but one of the universal joints in this figure.

The universal joint includes a casing 20 having a passageway 21, which in the case of the universal joint 11 is externally threaded as at 22 for engagement with the nipple 10. The passageway 21—a of the universal joint 13 is internally threaded to receive the pipe section 12.

The casing 20 is enlarged as at 23 to form a chamber and this portion of the casing is externally threaded to receive a retaining ring 24, said ring having a flange 25 which engages and supports an angular packing 26. The packing 26 is preferably metallic and engages the ball part 27 which latter is conveniently hemispherical and is adapted to ride upon the packing or bushing 26.

The pipe section 12 is threaded into an axial opening 28 in the ball member 27, and the latter is provided with an internal annular shoulder 29, against which is seated an expansion helical spring 30, the opposite end of said spring engaging an annular shoulder 31 formed in the casing 20 adjacent to the passageway 21.

It will be observed that the spring 30 performs a two-fold function, namely; tends to maintain the pipe section 12 axially with respect to the passageway 21, and therefore tends to return said pipe section to a substantially vertical position if displaced angularly; and to maintain the ball part 27 in fluid tight engagement with the packing 26. The spring 30 not only maintains a fluid tight joint, but in the event that any foreign particles get between the ball part 27 and the packing 26, the spring will yield sufficiently to prevent any hard particles from either scoring the surface of the ball part or the bearing surface of the packing and thus tend to expel such particles.

The universal joint 13 is substantially identical with the joint 11, as pointed out, and the pipe section 14 is provided with an elbow portion 32 so that the threaded part 33 of said pipe section may conveniently axially engage the ball part 27 of said joint 13, the pipe section 14, therefore, normally projecting at substantially a right angle to the pipe section 12 and the spring 30—a of the joint 13 tending to maintain said pipe section 14 in the position shown.

As the pipe section 14 and the coupler head 15 are relatively heavy and present a considerable leverage on the spring 30—a at least, it is desirable that the auxiliary supporting member 18 be provided, which will permit any normal manipulation or other displacement angularly of the pipe sections relative to each other and yet relieve the springs 30 and 30—a of too great a distortion which might tend to unduly distort or prematurely devitalize them.

Referring now to the form of the device shown in Figure 3, the universal joint 11—a, as will be seen from the part thereof shown in section, is substantially identical with the joint 11, the exception being that the upper portion 20—a of the casing and the threaded outlet member 22—a of the joint 11—a is disposed at an inclination to the lower part 23—a of the casing, so that the part 22 may conveniently engage the outlet nipple 10 of the angle cock 7 in the event that said nipple extends at an inclination to the vertical.

The substantially vertical pipe section 34 is formed in two sections, 12—a and 12—b, connected by a threaded joint 12—c, for the reason that in this form of the invention the pipe section 12—a is formed integrally with the ball member 27—a of the joint 11—a and similarly the pipe section 12—b is formed integrally with the casing 20—a of the universal joint 13—a.

Carrying this feature throughout the coupling, it will be observed that the pipe section 14—a is made integrally with the ball member 27—c of the joint 13—a.

The pipe section 14—a is supported additionally, as in the form of the invention shown in Figure 1, by the provision of the helical spring 18—a, links 19—a and a bracket member 35 which encircles the portion 20—a of the joint 11—a and has a lug 36 for connection to one of the links 19—a.

Having thus described my invention and illustrated its use, what I claim as new and desire to secure by Letters Patent is:—

1. In a structure for forming a connection between relatively movable pipe members, a coupling device including a depending pipe supported by one of said pipe members, a plurality of universally movable joints in said depending pipe including annular seat members, and ball portions engaging said seat members, one of the sections of said depending pipe having an integral curved portion for bringing a part thereof into approximate parallelism with said first mentioned pipe members, and means in each of said joints for holding said ball portions against said seat members for tending to maintain said depending pipe in a predetermined position.

2. In a structure for forming a connection between relatively movable pipe members, a coupling device including a depending pipe supported by one of said pipe members, a plurality of universally movable joints in said depending pipe including annular packing members, and ball portions engaging said packings, one of the sections of said depending pipe having an integral curved portion for bringing a part thereof into approximate parallelism with said first mentioned pipe members, and yieldingly resistant means in each of said joints for holding said ball portions against said packings and for tending to maintain said depending pipe in a predetermined position.

3. In a structure for forming a connection between relatively movable pipe members, a flexible conduit including a normally substantially vertical pipe section, a normally substantially horizontal pipe section; a universal joint for said pipe sections, and means for normally tending to seal said joint and to maintain said pipe sections in substantially vertical and horizontal position, respectively.

4. In a structure for forming a connection between relatively movable pipe members, a flexible conduit including a normally substantially vertical pipe section, a normally substantially horizontal pipe section; a universal joint for said pipe section, and yieldingly resistant means for normally sealing said joint and tending to maintain said pipe sections in substantially vertical and horizontal position, respectively.

5. In a structure for forming a connection between relatively movable pipe members, a flexible conduit including a normally substantially vertical pipe section, a normally substantially horizontal pipe section, a universal joint for said pipe sections, and means in said universal joint for normally tending to maintain said pipe sections in substantially vertical and horizontal position said means serving to hold the pipe sections sealed against leakage in all positions of relative angularity, respectively.

6. In a device of the character described, in combination, a depending conduit including a plurality of universally jointed sections, means associated with each joint performing the dual function of maintaining the joint sealed and for maintaining said sections in predetermined angularity, and auxiliary means cooperating with said last named means for relieving the latter of strain.

7. In a device of the character described, in combination, a depending conduit including a plurality of universally jointed sections, means associated with each joint performing the dual function of maintaining the joint sealed and for maintaining said sections in predetermined angularity, and auxiliary means cooperating with said last named means for relieving the latter of strain, said auxiliary means extending between at least two of said sections.

8. In a device of the character described, in combination, a depending conduit including a plurality of universally jointed sections, means associated with each joint performing the dual function of maintaining the joint sealed and for maintaining said sections in predetermined angularity, and auxiliary means cooperating with said last named means for relieving the latter of strain, said auxiliary means spanning at least one of said joints.

In testimony whereof I have hereunto signed my name.

FRANCIS N. BARD.

CERTIFICATE OF CORRECTION.

Patent No. 1,883,469. October 18, 1932.

FRANCIS N. BARD.

It is hereby certified that error appears in the printed specification of the above numbered patent requiring correction as follows: Page 2, line 128, claim 1, before "for" insert the word "and"; and that the said Letters Patent should be read with this correction therein that the same may conform to the record of the case in the Patent Office.

Signed and sealed this 27th day of December, A. D. 1932.

M. J. Moore,
Acting Commissioner of Patents.

(Seal)